(12) United States Patent
Ruckdeschel

(10) Patent No.: US 6,971,673 B2
(45) Date of Patent: Dec. 6, 2005

(54) TUBULAR GAS GENERATOR

(75) Inventor: Rolf Ruckdeschel, Schwangau (DE)

(73) Assignee: TRW Airbag Systems GmbH, Aschau/Inn (DE)

( * ) Notice: Subject to any disclaimer, the term of this patent is extended or adjusted under 35 U.S.C. 154(b) by 227 days.

(21) Appl. No.: 10/440,659

(22) Filed: May 19, 2003

(65) Prior Publication Data
US 2003/0218322 A1 Nov. 27, 2003

(30) Foreign Application Priority Data
May 21, 2002 (DE) .......................... 202 07 862 U

(51) Int. Cl.⁷ .............................................. B60R 21/26
(52) U.S. Cl. .................................... 280/741; 102/530
(58) Field of Search ............................... 280/736, 741; 102/530, 531, 275.1, 275.9

(56) References Cited

U.S. PATENT DOCUMENTS

| 4,109,578 | A | | 8/1978 | Goetz | |
|---|---|---|---|---|---|
| 5,052,302 | A | * | 10/1991 | Taddeo et al. | 102/204 |
| 5,253,895 | A | | 10/1993 | Bretfeld et al. | |
| 5,299,828 | A | | 4/1994 | Nakajima et al. | |
| 5,527,405 | A | | 6/1996 | Schleicher et al. | |
| 5,533,754 | A | | 7/1996 | Riley | |
| 5,540,154 | A | * | 7/1996 | Wilcox et al. | 102/275.1 |
| 5,562,303 | A | | 10/1996 | Schleicher et al. | |
| 5,585,048 | A | | 12/1996 | Schleicher et al. | |
| 5,589,662 | A | | 12/1996 | Schleicher et al. | |
| 5,704,640 | A | * | 1/1998 | Monk et al. | 280/741 |
| 5,895,881 | A | * | 4/1999 | Thiesen et al. | 102/202 |
| 6,095,559 | A | * | 8/2000 | Smith et al. | 280/741 |
| 6,834,594 | B2 | * | 12/2004 | Herrmann et al. | 102/530 |

FOREIGN PATENT DOCUMENTS

| DE | 3932576 A1 | 4/1991 |
|---|---|---|
| DE | 4310853 A1 | 10/1994 |
| DE | 19603703 A1 | 8/1997 |
| DE | 10009417 A1 | 9/2001 |
| EP | 0496488 A1 | 7/1992 |
| EP | 0667263 A1 | 8/1995 |
| EP | 0995645 A2 | 4/2000 |

* cited by examiner

Primary Examiner—David R. Dunn
(74) Attorney, Agent, or Firm—Tarolli, Sundheim, Covell & Tummino L.L.P.

(57) ABSTRACT

A gas generator comprises a tubular housing of a pressure-resistant material and a propellant strand incorporated in the housing. The propellant strand is provided with an envelope surrounding the propellant strand. The envelope is dimensionally stable and substantially rests against the entire outer surface of the propellant strand. The envelope is formed such that in the case of an increase in pressure it expands and rests against the inner surface of the housing.

19 Claims, 3 Drawing Sheets

TUBULAR GAS GENERATOR

TECHNICAL FIELD

This invention relates to a gas generator for use in a vehicle occupant restraint system.

BACKGROUND OF THE INVENTION

Conventional gas generators comprise a tubular housing of a pressure-resistant material and a propellant strand incorporated in the housing, the propellant strand being provided with an envelope surrounding the propellant strand.

Such tubular gas generator is already known from DE-A1 100 09 417. This tubular gas generator has axially extending passages which are formed by a propellant charge which has a central bore and is cross-shaped in cross-section, the propellant charge being surrounded by a shrinkable tube. For insulation purposes, the shrinkable tube may also be disposed on the outside of the tubular housing.

EP 0 995 645 A2 describes a tubular gas generator in which a propellant strand provided with radially protruding extensions is inserted in a tubular housing of pressure-resistant material, the radial extensions resting against the inner wall of the housing. Due to the special geometry of the propellant strand, passages extending in axial direction are thus formed between the respective radial extensions to pass on the pressure wave generated by an ignition element. To ensure an as complete a deflagration of the solid propellant as possible, the bores incorporated in the housing are at least partly insulated.

DE-A1 39 32 576 describes a gas-generating means for a gas generator for ejecting ammunition or for filling air bags, which has a slowly burning solid propellant in the form of a tube or strand and an explosive coating resting against a longitudinal side of the solid propellant. The solid propellant can have a hollow cylindrical shape, so that inside the propellant strand an axially extending passage is formed. The explosive coating then lies inside this passage. Alternatively, it is suggested to provide the solid propellant with an envelope. In this case, the cross-section of the solid propellant is star-shaped and the axial passages extend between the individual extensions of the propellant strand.

The tubular gas generators provided for use in vehicle occupant restraint systems must have reaction times within the range of few milliseconds. To this end, a deflagration of propellant must be ensured, which takes place completely and in the shortest possible time. It must therefore be ensured that the propellant is ignited virtually simultaneously over the entire length of the gas generator. Ignition is mostly effected via a gas pressure wave generated by an ignition element, which can propagate along the passages extending in axial direction in the tubular gas generator. To compensate energy losses of the pressure wave and to ensure a uniform ignition, the propellant can usually also be provided with an explosive coating which is activated by the pressure wave.

Due to this special ignition mechanism for tubular gas generators, there is usually proposed the formation of passages extending in axial direction along the propellant strand. For forming these passages, complicated propellant geometries had to be used so far. Since the stability of the propellant geometry must be ensured during the lifespan of the vehicle, it is not possible to employ any kind of pyrotechnical propellant charges. In EP-A2 995 645, for instance, the use of a fiber-reinforced pyrotechnical propellant is regarded as advantageous. The embodiment of a hollow cylindrical propellant strand with internal explosive coating, which is described in DE 39 32 576 A1, cannot be realized in technical terms and leads to insufficient deflagration properties.

In comparison with this, the invention provides a tubular gas generator of a simple structure and inexpensive to produce, for the production of which known techniques can be used.

BRIEF DESCRIPTION OF THE INVENTION

According to the invention, a gas generator comprises a tubular housing of a pressure-resistant material and a propellant strand incorporated in the housing. The propellant strand is provided with an envelope surrounding the propellant strand. The envelope is dimensionally stable and substantially rests against the entire outer surface of the propellant strand. The envelope is formed such that in the case of an increase in pressure it expands and rests against the inner surface of the housing.

In accordance with the invention, relatively simple strand profiles can thus be used for the propellant. Passing of the pressure wave generated by an ignition element upon activation of the tubular gas generator is ensured by the ability of the envelope to expand in the case of an increase in pressure and expose the propellant surface. Therefore, the presence of axial passages extending along the propellant strand can be ignored. The envelope itself can be regarded both as a moisture barrier protecting the propellant and as an insulation promoting the increase in pressure in the gas generator housing, and thus combines both functions in one component which is extremely inexpensive to manufacture. By means of the envelope, the propellant strand also gains in strength, so that it can easily be introduced into the tubular housing.

To increase the compressive strength, the tubular housing may comprise a plurality of layers. Preferably, the housing has an inner layer as well as an outer layer of plastic material as well as a middle layer of aluminum connected with the inner and outer layers via adhesion-promoting intermediate layers. Such layered structure ensures a particular compressive strength and flexibility at the same time. The multilayer housing can be produced by coextrusion of the materials mentioned above. The ratio of length to diameter (aspect ratio) of the housing is at least 10, preferably at least 50, and particularly preferably at least 100.

The propellant strand preferably is ring-shaped in cross-section, i.e. the strand constitutes a hollow cylinder. The production of such hollow cylindrical solid propellants by extrusion is known already and possible without any technical difficulties. As an alternative, the propellant strand can have any profile, for instance can be cylindrical or circular cylindrical, complex geometries being less preferable. For producing the propellant strand, known pyrotechnical solid propellants can be used, as they are described for instance in SEP-A2 995 645. The use of the composite propellants comprising a thermoplastic binder, optionally a plasticizer and an oxidizer, which are known from DE-A1 44 46 976, is also possible. The use of these composite propellants is advantageous due to their higher elasticity. For the purposes of the invention, the propellant strand may also consist of individual portions having a length of at least 3 cm.

On at least part of its outer surface, which is adjacent to the envelope, the propellant strand may be provided with a coating of an ignition mixture. As ignition mixture, an aluminized mixture of boron and potassium nitrate can be used, for instance. The ignition mixture is activated by the gas pressure wave generated by the igniter and ensures a complete ignition of the propellant strand over the entire length of the tubular gas generator.

The envelope preferably is made of a thin metal film, which may have a thickness up to about 0.1 mm, preferably between 0.02 mm and 0.05 mm. Alternatively, a plastic film may be used as well, which preferably is provided with a metal coating as moisture barrier. Particularly advantageously, the envelope is welded along its lateral edges upon inserting the propellant strand. In addition, the space between propellant strand and envelope can at least partly be evacuated. In this embodiment, only little resistance is exerted against the pressure wave generated by the ignition element. Energy losses by cooling and displacing an air cushion thus can largely be avoided.

On its longitudinal side, the envelope furthermore has at least one laterally protruding flattened portion. This portion provides a simple means for expanding the envelope upon passage of the pressure wave for igniting the propellant strand. The total surface area of the envelope preferably corresponds to the inner surface of the gas generator housing, so that the envelope itself need not be formed of an expandable material and nevertheless ensures a safe insulation upon activation of the gas generator. The insulation leads to an increase in pressure inside the housing and thus to a faster, controlled deflagration of propellant.

Particularly preferably, the envelope has two substantially opposite and laterally protruding flattened portions, which substantially can extend over the entire length of the envelope. These portions can be bent such that they are supported on the inner surface of the housing, after the propellant strand surrounded by the envelope has been inserted in the housing. Due to the dimensional stability of the envelope under ambient conditions, the propellant strand thus is safely fixed inside the housing and the occurrence of rattling noise can be avoided.

It is of advantage if the envelope has a flattened portion, which is at least one time laid around the total circumference of the propellant strand. If the flattened portion is laid in a manner such that it rests at the inner surface of the housing of the gas generator, a simple and safe fixing of the propellant strand inside the housing is achieved. A single layer flattened portion, which is laid one time around the total circumference of the propellant strand, forms a double-layer envelope around the propellant strand. A double layer flattened portion, which is laid one time around the total circumference of the propellant strand, forms a triple-layer envelope around the propellant, strand.

The invention thus creates an inexpensive tubular gas generator of simple structure, which ensures a safe ignitability without having to use complicated propellant geometries and which also offers a high functional reliability due to the casing of the propellant.

DETAILED DESCRIPTION OF THE PREFERRED EMBODIMENTS

Figure 1:
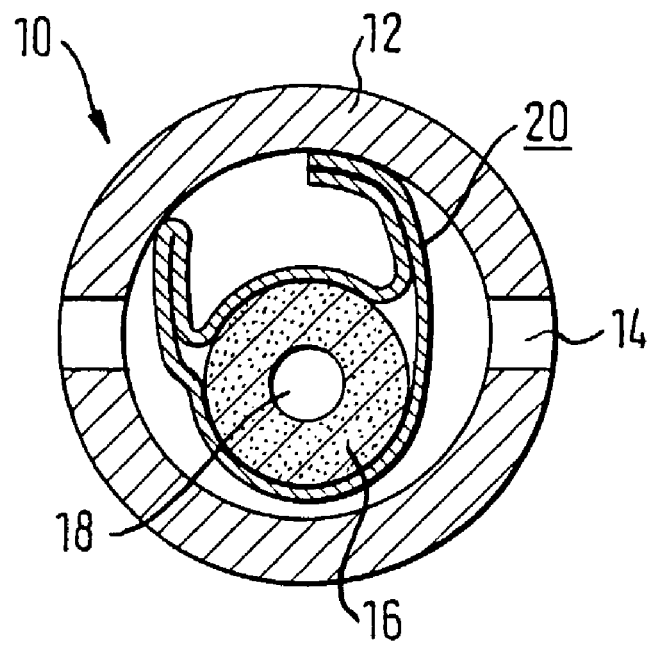
FIG. 1 shows a cross-section through a first embodiment of the tubular gas generator in accordance with the invention.
Figure 2:
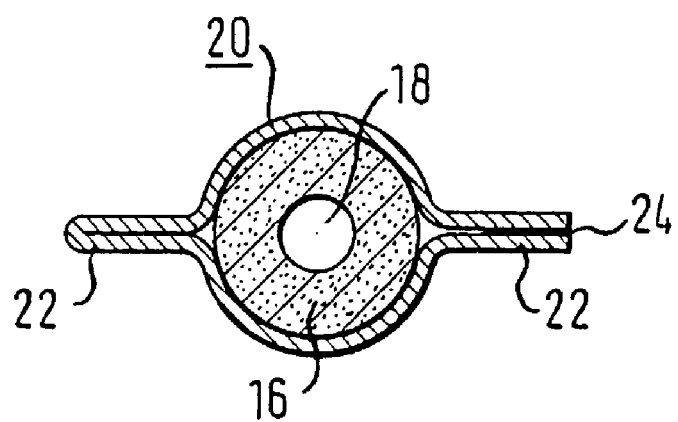
FIG. 2 shows a detail of the tubular gas generator of FIG. 1 in a cross-section.

With reference to FIGS. 1 and 2, there is shown a gas generator 10 with a tubular housing 12 which is made of a pressure-resistant material and is made up here of a single material. However, multilayer housings may be used as well; for instance, an inner layer and an outer layer of a plastic material as well as a middle layer of aluminum may be provided, which are connected with each other and have been made by coextrusion, for instance.

In the housing 12, bores 14 are incorporated for the discharge of gas. At least part of the bores may be provided with an insulation or membrane on their inside. Preferably, however, the bores are open. On an end face of the housing 12, a conventional ignition element (not shown) is disposed, which generates a gas pressure wave upon activation of the gas generator.

In the housing 12, a cylindrical propellant strand 16 is incorporated. In the embodiment represented here, the propellant strand has a ring-shaped cross-section, i.e. the strand constitutes a hollow cylinder with a central bore 18.

The propellant strand 16 is surrounded by an envelope 20 which is dimensionally stable under ambient conditions, for instance a thin metal film or plastic film. The layer thickness of the envelope may lie between 0.1 and 0.5 mm. The envelope preferably is made of aluminum or a metal-coated plastic film.

The envelope 20 rests substantially against the entire outer surface of the propellant strand 16. This means that the main part of the peripheral surface of the propellant strand 16 is in contact with the envelope and is held or supported by the same. In the embodiment shown here, the envelope has two substantially opposite and laterally protruding flattened portions 22 on its longitudinal side, which here substantially extend over the entire length of the envelope 20. For inserting the propellant strand 16 surrounded by the envelope into the housing 12, the lateral portions 22 are bent such that they are supported on the inner surface of the housing. Advantageously, the lateral portions can resiliently rest against the inner surface of the housing 12 and thus safely fix the propellant strand 16 inside the housing 12.

In a special embodiment it is provided that the envelope 20 surrounding the propellant strand 16 is welded along its lateral edges and, particularly preferably, is at least partly evacuated. In particular, a welding seam 24 may be formed in the vicinity of one of the laterally protruding portions.

Figure 3A:
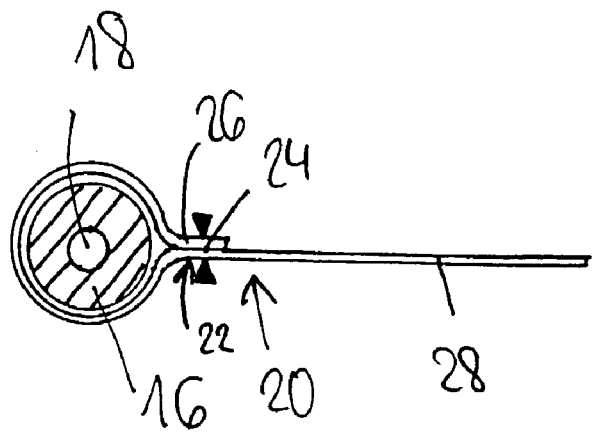
FIGS. 3a and 3b show a cross-section through a second embodiment of the tubular gas generator in accordance with the invention.
Figure 3B:
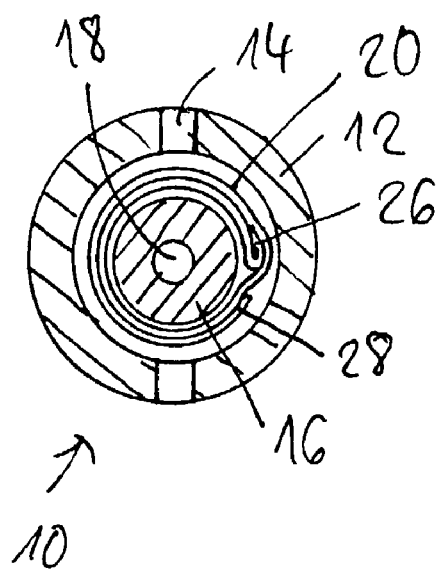

In the embodiment shown in FIGS. 3a and 3b, the envelope 20 is first laid one time around the propellant strand 16, thereby forming a short end 26 and a long end 28 of the envelope 20. The short end 26 and the long end 28 of the envelope 20 are connected with each other by the welding seam 24 (FIG. 3a). The long end 28 forms a flattened portion 22 with a length equal to the outer circumference of the envelope 20, so that it ends near the welding seam 24 (FIG. 3b) if it is laid one time around the envelope 20 of the propellant strand 16, thereby forming a double-layer envelope 20 around the propellant strand 16.

Figure 4A:
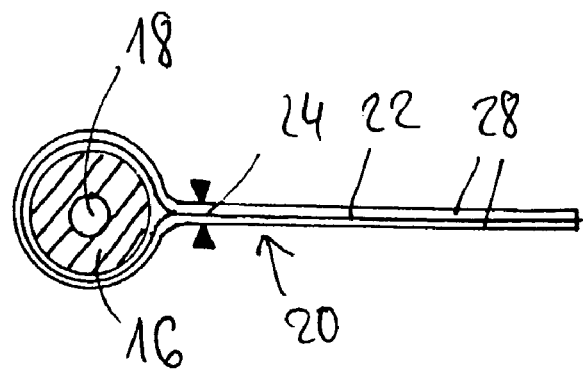
FIGS. 4a and 4b show a cross-section through a third embodiment of the tubular gas generator in accordance with the invention.
Figure 4B:
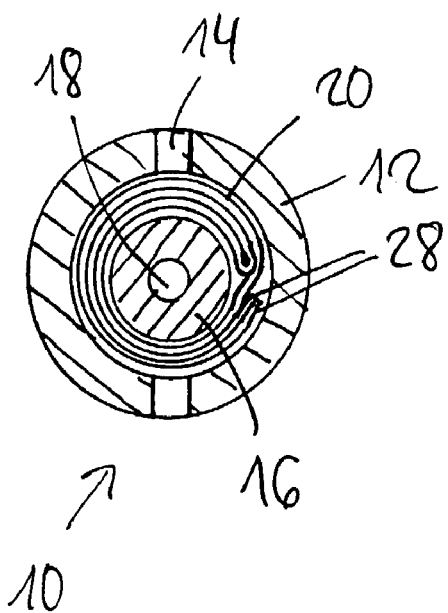

FIGS. 4a and 4b show a further embodiment in which, in a first step, the envelope 20 is laid one time around the propellant strand 16, thereby forming two long ends 28. The two long ends 28 of the envelope 20 are connected with each other by the welding seam 24 situated near the propellant strand 16 (FIG. 4a). The long ends 28 form a flattened portion 22 the length of which is about equal to the outer circumference of the envelope 20. If the flattened portion 22 is laid one time around the envelope 20 of the propellant strand 16, a triple-layer envelope 20 is formed around the propellant strand 16 (FIG. 4b).

As soon as a sensor disposed in the vehicle detects a vehicle accident, the ignition element disposed on an end face of the gas generator 10 is activated via an electric signal. This ignition element generates a gas pressure wave, which is passed through the envelope 20 and expands the same such that the envelope 20 rests against the inner surface of the housing 12 and thus seals the bores 14.

The gas pressure wave also leads to an ignition of the propellant strand 16 along its outer surface. To ensure a safe ignition and to compensate energy losses upon passage of the gas pressure wave, the propellant strand may at least partly be coated with a temperature- or pressure-sensitive ignition mixture on its outer surface. The ignition mixture for instance is a mixture of a fine metal powder and an oxidizer, such as boron and potassium nitrate or aluminum and potassium perchlorate. Preferably, however, the propellant itself is sufficiently sensitive to ensure a safe ignition.

The beginning deflagration of propellant leads to an increase in pressure inside the housing, which on the one hand promotes the further deflagration of propellant and on the other hand effects a bursting of the envelope 20 in the vicinity of the bores 14. This results in an equilibrium pressure of the amount of gas generated by the deflagration of the propellant strand 22 and the gas volume escaping through the bores 14. Within the required reaction time of few milliseconds, the escaping gases then activate a safety means, for instance an inflatable gas bag, a splinter protection or a knee protector.

What is claimed is:

1. A gas generator comprising a tubular housing of a pressure-resistant material and defining a chamber, a propellant strand in said housing chamber, said propellant strand having an envelope surrounding said propellant strand, wherein said envelope is dimensionally stable and rests substantially against the entire outer surface of said propellant strand and has at least a portion spaced from an inner surface of said chamber, and said envelope being formed such that in the case of an increase in pressure said envelope expands and rests against the inner surface of said chamber.

2. The gas generator as claimed in claim 1, wherein said tubular housing comprises a plurality of layers.

3. The gas generator as claimed in claim 1, wherein said propellant strand is cylindrical.

4. The gas generator as claimed in claim 1, wherein on at least part of the outer surface of said propellant strand, said propellant strand is provided with a coating of an ignition mixture.

5. The gas generator as claimed in claim 1, wherein said envelope is formed of a metal film.

6. The gas generator as claimed in claim 1, wherein said envelope is formed of a plastic film.

7. The gas generator as claimed in claim 6, wherein said plastic film is metal-coated.

8. The gas generator as claimed in claim 1, wherein the periphery of the envelope extends a first distance from the longitudinal axis of said envelope under ambient conditions, the periphery of said envelope extending a second distance from the longitudinal axis of said envelope upon said envelope expanding, said second distance being greater than said first distance.

9. The gas generator as claimed in claim 1, wherein said gas generator is designed to be used in a vehicle occupant restraint system.

10. A gas generator comprising a tubular housing of a pressure-resistant material and defining a chamber, a propellant strand in said housing chamber, said propellant strand having an envelope surrounding said propellant strand, wherein said envelope is dimensionally stable and rests substantially against the entire outer surface of said propellant strand, and said envelope being formed such that in the case of an increase in pressure said envelope expands and rests against an inner surface of said chamber, wherein said housing has an inner layer as well as an outer layer of plastic material as well as a middle layer of aluminum connected with said inner and outer layers.

11. A gas generator comprising a tubular housing of a pressure-resistant material and defining a chamber, a propellant strand in said housing chamber, said propellant strand having an envelope surrounding said propellant strand, wherein said envelope is dimensionally stable and rests substantially against the entire outer surface of said propellant strand, said envelope being formed such that in the case of an increase in pressure said envelope expands and rests against an inner surface of said chamber, wherein on at least part of the outer surface of said propellant strand, said propellant strand is provided with a coating of an ignition mixture, and wherein said ignition mixture is a mixture of boron and potassium nitrate or aluminum and potassium perchlorate.

12. The gas generator as claimed in claim 11, wherein said envelope has a flattened portion, which is at least one time laid around the total circumference of said propellant strand.

13. The gas generator as claimed in claim 12, wherein said flattened portion has a single layer to form a double layer envelope around said propellant strand.

14. The gas generator as claimed in claim 12, wherein said flattened portion has two layers to form a triple layer envelope around said propellant strand.

15. A gas generator comprising a tubular housing of a pressure-resistant material and defining a chamber, a propellant strand in said housing chamber, said propellant strand having an envelope surrounding said propellant strand, wherein said envelope is dimensionally stable and rests substantially against the entire outer surface of said propellant strand, and said envelope being formed such that in the case of an increase in pressure said envelope expands and rests against an inner surface of said chamber, wherein on a longitudinal side of said envelope, said envelope has at least one laterally protruding flattened portion.

16. The gas generator as claimed in claim 15, wherein there are provided two substantially opposite and laterally protruding flattened portions.

17. The gas generator as claimed in claim 16, wherein said flattened portion is supported on an inner surface of said housing.

18. The gas generator as claimed in claim 15, wherein said flattened portions extend substantially over the entire length of said envelope.

19. A gas generator comprising a tubular housing of a pressure-resistant material and defining a chamber, a propellant strand in said housing chamber, said propellant strand having an envelope surrounding said propellant strand, wherein said envelope is dimensionally stable and rests substantially against the entire outer surface of said propellant strand, and said envelope being formed such that in the case of an increase in pressure said envelope expands and rests against an inner surface of said chamber, wherein said envelope surrounding said propellant strand is welded and at least partly evacuated.

* * * * *